United States Patent [19]
Dang et al.

[11] Patent Number: 5,446,855
[45] Date of Patent: Aug. 29, 1995

[54] SYSTEM AND METHOD FOR DISK ARRAY DATA TRANSFER

[75] Inventors: Joe Dang, Poway; Bernd Stramm, San Diego; Robert Long, Vista, all of Calif.

[73] Assignee: BusLogic, Inc., Santa Clara, Calif.

[21] Appl. No.: 192,389

[22] Filed: Feb. 7, 1994

[51] Int. Cl.6 ............................................. G06F 12/00
[52] U.S. Cl. ............................ 395/401; 364/DIG. 1; 364/DIG. 2; 364/254
[58] Field of Search ............... 364/DIG. 1, DIG. 2; 371/7, 8.1, 10.1, 21.1, 23, 40.1, 40.2, 40.4, 43; 395/200, 250, 275, 375, 400, 425, 500, 575, 600

[56] References Cited

U.S. PATENT DOCUMENTS

| | | | |
|---|---|---|---|
| 4,761,785 | 8/1988 | Clark et al. | 371/51 |
| 4,775,978 | 10/1988 | Hartness | 371/38 |
| 5,088,081 | 2/1992 | Farr | 369/54 |
| 5,101,492 | 3/1992 | Scultz et al. | 395/575 |
| 5,208,813 | 5/1993 | Stallmo | 371/10.1 |
| 5,210,860 | 5/1993 | Pfeffer et al. | 395/575 |
| 5,212,785 | 5/1993 | Powers et al. | 395/575 |
| 5,235,601 | 8/1993 | Stallmo et al. | 371/40.1 |

OTHER PUBLICATIONS

Brochure for Distributed Processing Technology, *Technology Focus*, "Understanding RAID", pp. 1–7.

*Primary Examiner*—Robert B. Harrell
*Attorney, Agent, or Firm*—Greg T. Sueoka; Leif R. Sloan

[57] ABSTRACT

A system for managing I/O requests directed to a disk array comprises a processing unit, predetermined amounts of Random Access Memory (RAM) and Read-Only Memory (ROM), an operating system, a virtual disk driver, an input device, an output device, and a disk array. The virtual disk driver comprises a request modification memory, a pending queue, an active queue, a stripe buffer, a span buffer, and a parity buffer. The system breaks each I/O request received into one or more subrequests according to request type, request length and the storage capacity of a sector-row within the disk array. Subrequests are entered into a pending queue in first-in, first-out (FIFO) order. Subrequests within the pending queue corresponding to write operations directed to a common sector-row are merged into a corresponding array request. Each array request is stored in an active queue. Once the number of array requests exceeds a predetermined constant, each array request is issued to the RAID type disk array.

A method for managing I/O requests directed to a disk array comprises the steps of: determining when a virtual disk I/O request directed to the disk array has been received; dividing each virtual disk I/O request into a number of subrequests based upon the request type, the length of the request, and the storage capacity of a sector-row; inserting each subrequest into the pending queue in FIFO order; merging subrequests in the pending queue associated with a write operation directed to an identical sector-row into an array request; storing the array request in the active queue; and issuing each array request in the active queue to the disk array.

26 Claims, 15 Drawing Sheets

| |
|---|
| POINTER TO NEXT ELEMENT |
| POINTER TO PREVIOUS ELEMENT |
| TARGET SECTOR-ROW ADDRESS |
| READ/WRITE FLAG |
| NUMBER OF FULL-SEGMENT WRITES TO TARGET STRIPE |
| FULL-SEGMENT WRITE FLAG FOR EACH DISK DRIVE |
| STARTING LOCATION WITHIN TARGET STRIPE |
| ENDING LOCATION WITHIN TARGET STRIPE |
| NUMBER OF REQUESTS PER DISK DRIVE |
| MAP OF SECTORS TO BE WRITTEN ON EACH DISK DRIVE |
| SET OF POINTERS FOR VIRTUAL DISK I/O REQUESTS DIRECTED TO EACH DISK DRIVE |

*FIG. 5*

| VIRTUAL DISK REQUEST | READ/WRITE | DATA SIZE | VIRTUAL DISK ADDRESS |
|---|---|---|---|
| 1 | Write | 12k | 160k |
| 2 | Read | 40k | 180k |
| 3 | Write | 20k | 192k |
| 4 | Write | 16k | 220k |

*FIG. 10A*

| PENDING QUEUE ELEMENT | VIRTUAL DISK I/O REQUEST | VIRTUAL DISK ADDRESS | TARGET SECTOR-ROW | READ/ WRITE |
| --- | --- | --- | --- | --- |
| 1 | 1 | 160k | 3 | Write |
| 2 | 2 | 180k | 3 | Read |
| 3 | 3 | 192k | 3 | Write |
| 4 | 3 | 208k | 3 | Write |
| 5 | 4 | 220k | 3 | Write |
| 6 | 4 | 224k | 3 | Write |

*FIG. 10B*

| ACTIVE QUEUE ELEMENT | CREATED FROM PENDING QUEUE ELEMENT(S) | READ/ WRITE |
| --- | --- | --- |
| 1 | 1 | Write |
| 2 | 2 | Read |
| 3 | 3<br>4<br>5<br>6 | Write |

*FIG. 10C*

SYSTEM AND METHOD FOR DISK ARRAY DATA TRANSFER

BACKGROUND OF THE INVENTION

1. Field of the Invention

The present invention relates generally to data storage devices, and more particularly to a system and method for managing requests directed to a disk array. Still more particularly, the present invention is a system and method for managing read and write requests directed to a RAID type disk array.

2. Description of the Background Art

In a data processing environment, multiple data storage devices can be used for improving data storage reliability. Improved reliability occurs as a result of storing duplicate data or by storing parity information corresponding to each block of data that is written. A well-known organization of multiple data storage devices is that of a Redundant Array of Inexpensive Disks (RAID). In a RAID system, each disk drive in the array is partitioned into a set of data segments, such that each data segment stores a predetermined quantity of data. A data write request corresponding to a block of data having a given size occurs across at least one and possibly several disk drives within the array, depending upon the exact size of the data block and the predetermined data segment size. In a like manner, a read request for a given data block can also occur across more than one disk drive within the array. The partitioning of data across an identical segment on multiple disk drives is known as "striping." Each group of identical segments traversing the array of disk drives is referred to as a "stripe."

RAID systems exhibit several distinct architectures; the most commonly encountered RAID architectures are known as RAID 1, RAID 3, and RAID 5. The classification of RAID architectures is described in the paper "A Case for Redundant Arrays of Inexpensive Disks" by Patterson, Gibson, and Katz, published in 1987. In a RAID I architecture, data duplication is used to provide improved data storage reliability. This is commonly referred to as "mirroring." RAID 3 and RAID 5 architectures provide improved data storage reliability through the use of parity information. When one of the disk drives within the RAID system ceases to function properly, the data stored on the problematic disk drive can be retrieved directly if duplicate data has been stored, or the data can be reconstructed if parity information has been stored. In either case, the duplicate data or the parity information must have been stored on one of the disk drives that is functioning properly.

Typically, data is stored via striping across several disk drives in a RAID 1 architecture. For a set of disk drives used to store data, an additional set of disk drives is used to store a duplicate copy of the data. The number of disk drives in the additional set is such that both disk drive sets have equal data storage capacities. Herein, both disk drive sets are assumed to have an identical number of disk drives for simplicity. Thus, for a given number of disk drives N used in a stripe, N additional disk drives are required to provide data redundancy. If a given disk drive fails, the additional disk drive associated with the failed disk drive can be used for subsequent data accesses. Use of an additional disk drive set, however, significantly increases the hardware cost, operational costs, and space requirements related to storing data. When N additional disk drives are used, these costs and requirements are doubled. Such additional costs may prevent a given RAID I implementation from being a cost-effective means for increasing data reliability.

A RAID 3 architecture dedicates one disk drive as a parity drive for storing parity information corresponding to data stored on the other disk drives in the disk array. Accesses to the remaining disk drives in the disk array occur in parallel, thereby maximizing the data transfer rate for large blocks of data. The data transfer rate is further enhanced by requiring that all disk drive spindles be synchronized. If one of the disk drives used for storing data fails, the data corresponding to the failed disk drive is reconstructed by performing an Exclusive-OR (XOR) upon the data stored on the remaining functional disk drives and the parity information stored on the dedicated parity drive. Updated parity information must be computed for each write operation. Since all disk drives are written to in parallel, only one write operation can be issued at any given time. Writing a block of data that occupies only a portion of a stripe is inefficient in RAID 3 systems because some of the disk drives are not used for storing data in the read-modify-write operation. The unused disk drives, however, cannot be used for another write operation at the same time due to the parallel access limitation described above.

When new or modified data is to be written to a target stripe, the parity information is computed by performing an XOR between the data currently stored at the target stripe and the new or modified data. The computed parity information is then written on the parity drive. The process of computing the parity information therefore requires a read operation to obtain the data currently stored at the target stripe; a modify operation corresponding to the XOR performed; and a write operation, where the new or modified data and the computed parity information are written to the target stripe. While the hardware costs are reduced compared to RAID 1 systems, the read-modify-write process is required each time data is to be written to the RAID 3 disk array. This significantly increases the time required to complete a write operation. The time required to perform a write operation effectively doubles, and therefore decreases the overall RAID 3 system performance. Due to the limitations described above, RAID 3 systems are generally useful only in environments where large data records are maintained.

The RAID 5 architecture stores parity information corresponding to each data stripe, but does not dedicate a single disk drive for storing all parity information. Instead, parity information is stored on one of the disk drives within each stripe according to a predetermined pattern. In other words, one disk drive within each stripe is predefined as the parity disk, and the parity disk on successive stripes are not identical. The RAID 5 organization therefore allows all disk drives to be used for storing data. In addition, the RAID 5 organization allows multiple write operations to occur simultaneously when each write operation accesses a unique subset of disk drives and therefore a unique disk drive for storing parity information. The RAID 5 architecture therefore eliminates one of the bottlenecks associated with RAID 3 architectures.

Two methods exist for the computation of parity via a read-modify-write process in RAID 5 systems. The first method is to compute parity in the same manner as in RAID 3 systems. Namely, first read the data stored on each disk drive within the target stripe; compute the new parity information by performing an XOR between the data read and the new or modified data to be written; and write the new or modified data and the computed parity information to the target stripe. The disk drive that has been defined as the parity drive for the target stripe receives the computed parity information. This first method for parity computation is referred to herein as a long write. Long writes are used when the number of disk drives in the stripe that are to receive the new or modified information is greater than a predetermined constant. Since information from each disk drive in a stripe must be read, operated upon, and written, the long write is an inefficient operation when small amounts of data are to be written.

The second read-modify-write method for computing parity information in a RAID 5 system is referred to herein as a short write. In a short write, only the data that will be overwritten or changed as a result of writing the new or updated data is read. Thus, if updated data is to be written to one segment within the target stripe, only the data stored within this segment and its corresponding parity information are read. Next, a first XOR operation is performed between the data read and the new or modified data. A second XOR operation is then performed between the target stripe's stored parity information and the result of the first XOR operation, the result of which is the computed parity information. Finally, the computed parity information is written in conjunction with the new or updated data to the target stripe, where the parity drive defined for the target stripe receives the computed parity information. Preferably, the computed parity information and the new or updated data are written simultaneously. Short writes are used when the number of disk drives within the target stripe that are to receive the new or modified information is less than the predetermined constant.

As in the case of RAID 3 systems, the read-modify-write process, even for short writes, results in a significant increase in the time required to perform a write operation since each write operation requires a read operation and a modify operation in addition to the actual writing of the new or updated data. In RAID 5 computational situations involving long write operations or multiple short write operations, the overall operation of the RAID 5 system is dramatically slower than systems using a single disk drive. Therefore, there is a need for a system and method for minimizing the amount of time required for performing read-modify-write operations in RAID systems, particularly when long write operations or multiple short write operations are required.

SUMMARY OF THE INVENTION

The present invention is a system and method for managing I/O requests directed to a disk array, where a read-modify-write process is used in the computation of parity information. Each I/O request treats the disk array as a single virtual disk, and specifies a corresponding virtual disk address. Each disk drive within the disk array is partitioned into a set of segments or sector-rows. A given stripe is formed by grouping an identical sector-row across all disks within the disk array.

The present invention breaks each I/O request received into one or more subrequests according to request type, request length and sector-row storage capacity. Each subrequest is entered into a pending queue in first-in, first-out (FIFO) order. Subrequests within the pending queue corresponding to write operations that are directed to a common sector-row are merged into a corresponding array request, where each array request is stored in an active queue. Once the number of array requests exceeds a predetermined constant, each array request is issued to the RAID type disk array. The issuance of each array request involves a read-modify-write operation for the calculation of parity when the array request involves one or more write operations. The system and method of the present invention eliminates the need for a read-modify-write operation associated with each write request received. Instead, a read-modify-write operation is performed only for each array request associated with a write operation, where each such array request has been created by merging together at least one and possibly several write requests received.

The system of the present invention comprises a processing unit, predetermined amounts of Random Access Memory (RAM) and Read-only Memory (ROM), an operating system, a virtual disk driver, an input device, an output device, and a disk array. Each element of the system has an input and an output coupled to a common system bus. In the preferred embodiment of the system, the operating system and the virtual disk driver reside in RAM. The virtual disk driver preferably comprises a request modification memory, a pending queue, an active queue, a stripe buffer, a span buffer, and a parity buffer, each of which have an input and an output coupled to the common system bus.

When an application program being executed by one or more processing units requires a disk access, the operating system issues a virtual disk I/O request to the virtual disk driver. The request modification means within the virtual disk driver receives the virtual disk I/O request, and proceeds to divide the virtual disk I/O request into subrequests. The request modification memory then stores each subrequest in the pending queue FIFO order. The presence of subrequests in the pending queue causes the request modification memory to merge those subrequests corresponding to write operations that are directed to an identical sector-row into a single array request, where the array request is stored in the active queue. Once the active queue contains a predetermined number of array requests, the request modification memory issues each array request. At this point, a read-modify-write operation is performed to update parity information before the data for a given array request is written to the target stripe corresponding to the target sector-row in the disk array.

The method of the present invention comprises the steps of: determining when a virtual disk I/O request directed to the disk array has been received; dividing each virtual disk I/O request into a number of subrequests based upon the request type, the length of the request, and the storage capacity of a sector-row; inserting each subrequest into the pending queue in FIFO order; merging the subrequests in the pending queue associated with a write operation directed to an identical sector-row into a single array request; storing the array request in the active queue; and issuing each array request in the active queue to the disk array.

BRIEF DESCRIPTION OF THE DRAWINGS

FIG. 5 is a block diagram of a preferred embodiment of the structure for an active queue entry;

FIGS. 10A, 10B, and 10C show the processing of an exemplary set of virtual disk I/O requests by the present invention.

DETAILED DESCRIPTION OF THE PREFERRED EMBODIMENT

Figure 1:
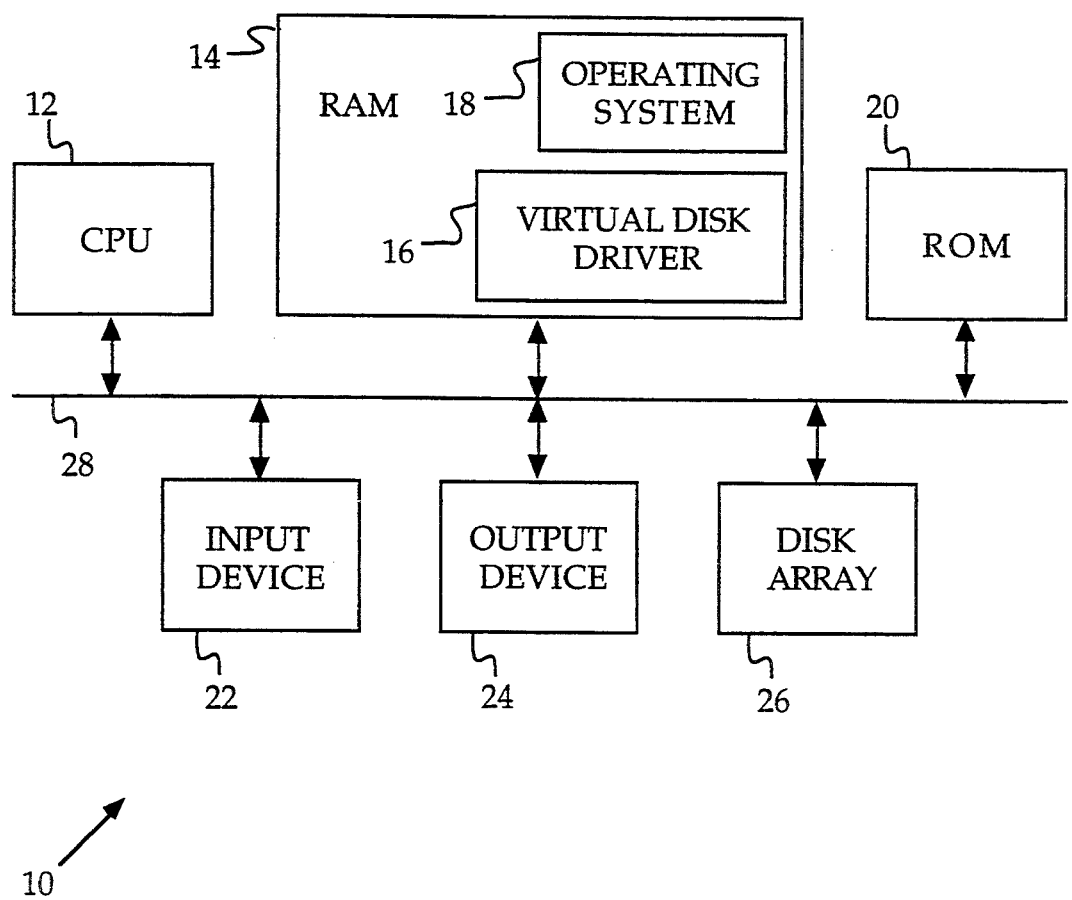
FIG. 1 is a block diagram of a preferred embodiment of a system for disk array request management constructed in accordance with the present invention.

Referring now to FIG. 1, a preferred embodiment of a system 10 constructed in accordance with the present invention is shown. The system 10 preferably comprises a processing unit 12, a predetermined amount of Random Access Memory (RAM) 14, a predetermined amount of Read-Only Memory (ROM) 20, an input device 22, an output device 24, and a disk array 26. A virtual disk driver 16 and an operating system 18 preferably reside within the RAM 14. Each element of the system 10 has an input and an output coupled to a common bus 28. In an exemplary embodiment, the system 10 of the present invention comprises an Intel 80486 microprocessor, 8 megabytes of RAM, a keyboard, a color display, a disk array 26 having six disk drives, a Novell Netware operating system (Novell, Inc., Provo, Utah), and the virtual disk driver 16.

The processing unit 12 executes steps in an application program 19 that receives data from and outputs data to the disk array 26. The application - 15 program 19 resides within RAM 14.

Figure 2:
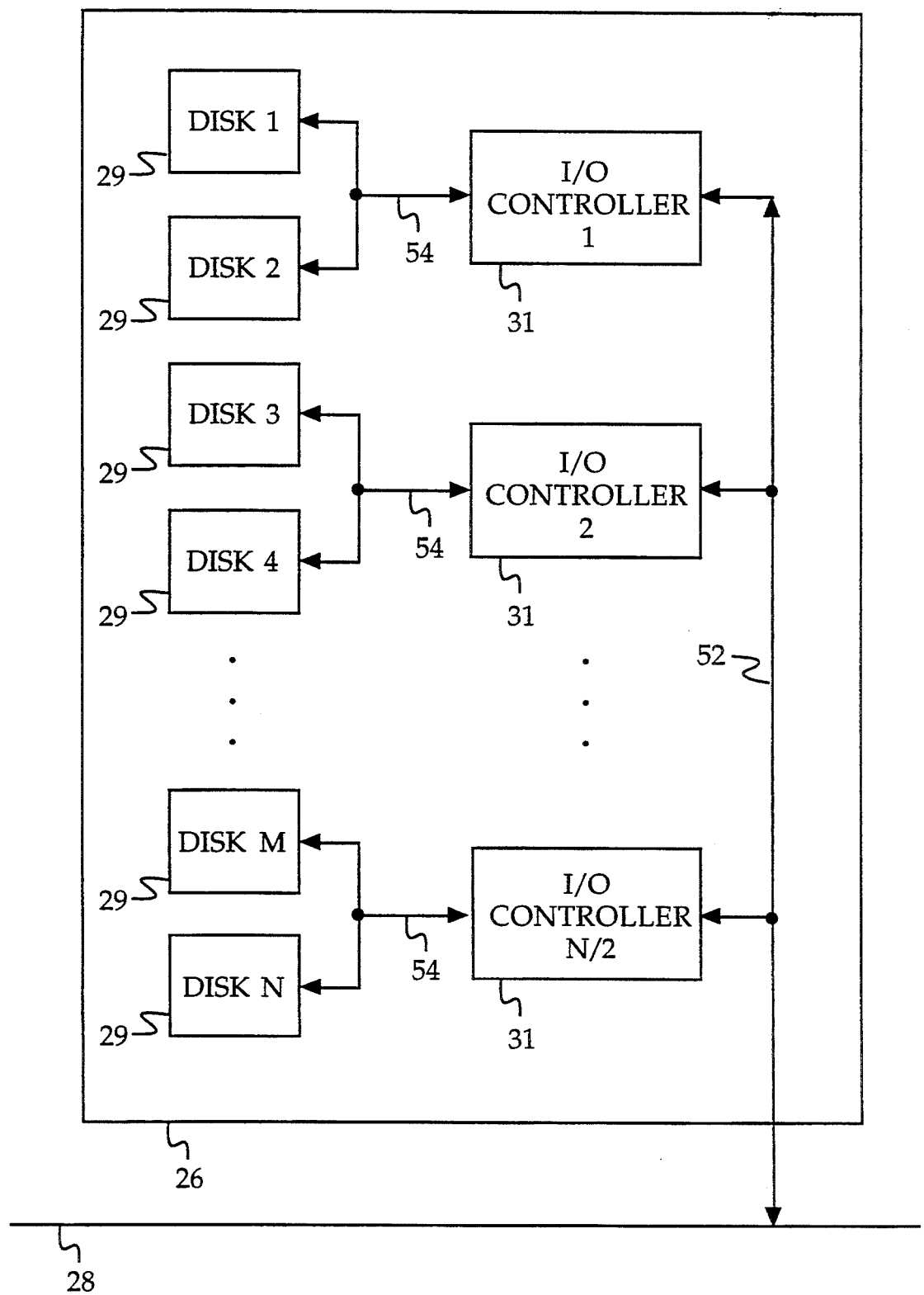
FIG. 2 is a block diagram of a disk array.

Referring now to FIG. 2, a block diagram of the disk array 26 is shown. The disk array 26 is preferably organized in a RAID 5 configuration. The disk array 26 comprises a plurality of disk drives 29 labeled as disk 1, disk 2, disk 3, disk 4, and so on through disk M and disk N, each having a bi-directional data port; a plurality of I/O controllers 31 labeled as I/O controller 1, I/O controller 2, and so on through I/O controller N/2, each having a first bi-directional data port and a second bi-directional data port; and a disk array data bus 52. The bi-directional data port of each disk drive 29 is coupled to the first bi-directional data port of a respective I/O controller 31 via a disk array data line 54. The number of disk drives assigned to each I/O controller 31 depends upon the specific I/O controller 31 implementation and the capabilities of the disk array data bus 52. In the preferred embodiment, each I/O controller 31 is assigned two disk drives. Therefore, the bi-directional data ports of disk 1 and disk 2 are coupled to the first bi-directional data port of I/O controller 1 via a disk array data line 54. In like manner, a disk array data line 54 couples the bi-directional data ports of disk 3 and disk 4 to the first bi-directional data port of I/O controller 2. Similarly, a disk array data line 54 couples the bi-directional data ports of disk M and disk N to the first bi-directional data port of I/O controller (N/2). Those skilled in the art will recognize that at least three disk drives 29 must be present to support a standard RAID 5 configuration, and that various I/O controller 31/disk drive 29 configurations are possible. In the preferred embodiment of the present invention, 3 to 16 disk drives 29 and 1 to 4 I/O controllers 31 are present. In an exemplary embodiment, each disk drive 29 is a Seagate ST42100, and each I/O controller 31 is a BusLogic BT747.

The disk array data bus 52 is coupled to the common system bus 28, and to the second bi-directional data port of each I/O controller 31. Thus, data transfers can occur between RAM 14 and one or more disk drives 29 within the disk array 26 under the direction of the appropriate I/O controller 31. In a RAID 5 configuration, each disk drive 29 is accessed independently, allowing more than one read or write operation to occur at the same time across different disk drives 29.

Each disk drive 29 within the disk array 26 possesses a predetermined total data storage capacity that can be expressed in terms of a number of sectors or as a number of bytes. The total data storage capacity of each disk drive 29 is partitioned into a set of segments or sector-rows, each having a predefined data storage capacity. In the preferred embodiment, each sector-row is defined to be thirty-two sectors. A stripe is then defined as the combination of identical sector-rows across each disk drive 29 in the disk array 26. Thus, a target sector-row is associated with a corresponding target stripe.

Referring again to FIG. 1, when the processing unit 12 executes an instruction within the application program 19 corresponding to an I/O operation, control is transferred to the operating system 18. In the preferred embodiment of the system 10, the operating system 18 treats the disk array 26 as comprising one or more "virtual disks." An I/O operation directed to a virtual disk specifies a single virtual disk address rather than an address on each disk drive 29 within the disk array 26. The operating system 18 creates a virtual disk I/O request corresponding to the I/O operation requested by the application program, and stores the virtual disk I/O request in RAM 14. A virtual disk I/O request can either be a virtual disk write request, for which data is to be written to the disk array 26, or a virtual disk read request requiring a disk array data read operation. After the virtual disk I/O request has been stored in RAM 14, the operating system transfers control to the virtual disk driver 16.

Figure 3:
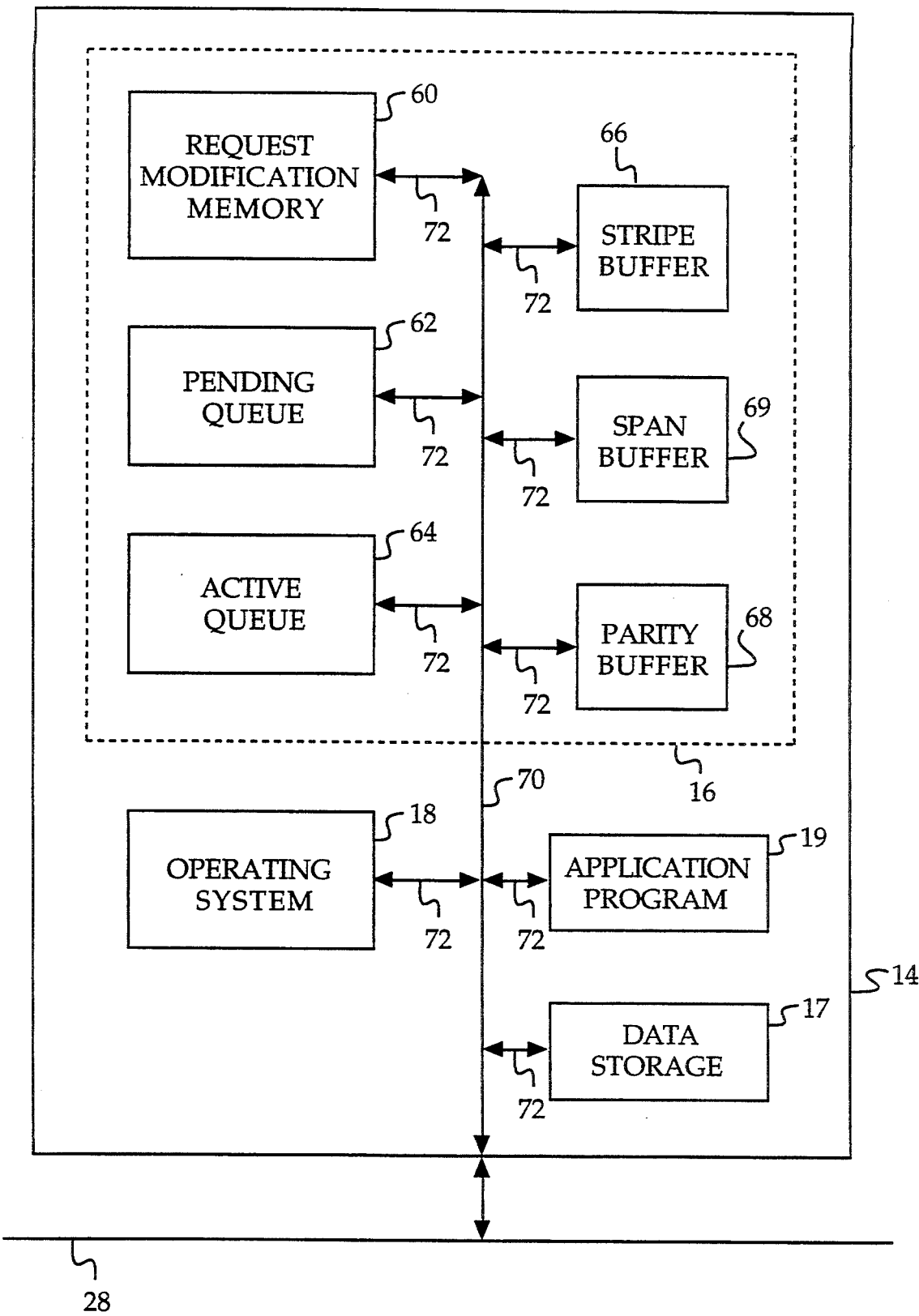
FIG. 3 is a block diagram of a preferred embodiment of the memory including a virtual disk driver constructed in accordance with the present invention.

Referring now to FIG. 3, a block diagram of a preferred embodiment of the virtual disk driver 16 and its couplings to the operating system 18 and the application program 19 within RAM 14 is shown. Within the RAM 14, a data storage 17 portion stores data that will be transferred to or read from the disk array 26. The virtual disk driver 16 preferably comprises a request modification memory 60, a pending queue 62, an active queue 64, a stripe buffer 66, a parity buffer 68, and a span buffer 69. Each element of the virtual disk driver 16 has an input and an output coupled to a data bus 70 via a data line 72. The memory 14 also includes other portions (not shown) for use in a conventional manner. The operating system 18, the application program 19, and the data storage 17 each have an input and an output that are also coupled to the data bus 70 via a data line 72. In the preferred embodiment, the request modification memory 60 is a sequence of computer program steps stored in in a portion of RAM 14. While the modification memory will now be describe as taking action and performing operations, those skilled in the art will realize that this means that the CPU 12 is performing such action by executing the program steps stored in the portion of RAM 14 referred to throughout this specification as the modification memory.

The request modification memory 60 breaks each virtual disk I/O request into one or more subrequests. After each subrequest has been created, the request modification memory 60 combines one or more subrequests into corresponding array requests based upon subrequest type. After a predetermined number of array requests have been created, the request modification memory 60 issues each array request to the disk array 26 in a RAID type operation. Only one read-modify-write operation is required for each write-related array request regardless of the number of individual virtual disk I/O requests each array request contains. In the prior art, a read-modify-write operation is performed for every write request directed to the disk array 26. The system 10 of the present invention therefore realizes a significant overall reduction in the time required to perform write operations over prior art RAID systems, particularly when an application program requires RAID 5 long writes or frequent RAID 5 short writes to the disk array 26.

In performing the above operations, the request modification memory 60 initiates data transfers to the pending queue 62, the active queue 64, the stripe buffer 66, the span buffer 69, and the parity buffer 68. The request modification memory 60 receives the location of the virtual disk I/O request from the virtual disk driver 16, and determines if the virtual disk I/O request is a write operation or a read operation. If the virtual disk I/O request is a read operation, the request modification memory 60 creates a single subrequest. If the virtual disk I/O request is a write operation, the request modification memory 60 creates a number of subrequests equal to the length of the block of data to be written divided by the sector-row storage capacity, where any fractional number obtained increases the number of subrequests required to the next higher integer. In other words, the number of subrequests created is equal to the number of disk drives 29 within the disk array 26 to which data is to be written. The request modification memory 60 also assigns a target sector-row address to each subrequest, and incorporates the target sector-row address into the subrequest. The target sector-row address is assigned by dividing the virtual disk address by the total data storage capacity of a stripe, where the storage capacity on the stripe that is dedicated to parity information is not included. The request modification memory 60 preferably attempts to ensure that each subrequest created from a single virtual disk I/O request is associated with an identical target sector-row. However, in the event that the length of a data block to be written is greater than the available storage capacity across the target stripe associated with the target sector-row, the request modification memory 60 associates a subsequent target sector-row with those subrequests that cannot be stored on the original target stripe corresponding to the original target sector-row. The request modification memory 60 stores each subrequest created into the pending queue 62 in FIFO order.

The pending queue 62 is a data storage means used to implement a FIFO queue. In the preferred embodiment, the pending queue 62 resides within RAM 14. The storage capacity of the pending queue 62 is dynamically allocated and deallocated according to the number of subrequests queued. Those skilled in the art will recognize that a pending queue 62 having a permanent, fixed size is possible in an alternate embodiment of the present invention.

Figure 4:
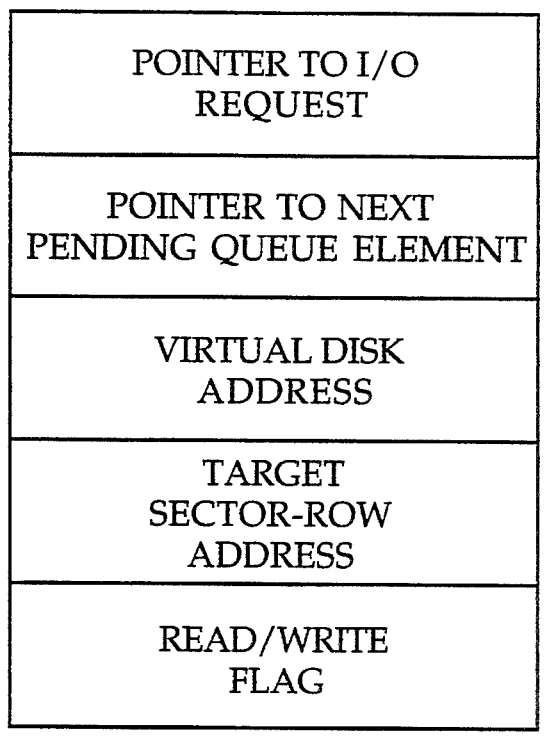
FIG. 4 is a block diagram of a preferred embodiment of the structure for a pending queue entry.

Each entry in the pending queue 62 is a subrequest created by the request modification memory 60. Referring now to FIG. 4, a block diagram of a preferred structure for a pending queue entry is shown. Each pending queue entry includes a pointer to the location of its corresponding virtual disk I/O request in RAM 14; a pointer to the next successive element in the pending queue; the virtual disk address; the target sector-row address associated with the virtual disk I/O request; and a flag indicating whether the subrequest corresponds to a read or to a write operation.

Referring again to FIG. 3, when subrequests are present in the pending queue 62, the request modification memory 60 transfers each subrequest into an appropriate array request. Pending queue subrequests corresponding to write operations and directed to the same target sector-row are merged together into a single array request directed to the same target sector-row. In the event that no array request exists, a new array request is created; otherwise, write-related subrequests are merged into already-existing array requests. In the case of read operations, the request modification memory 60 simply creates a separate array request for each read-related subrequest. The request modification means 60 stores each array request into the active queue 64 in sector-row order. An array request corresponding to a read operation and directed to a given target sector-row is inserted into the active queue 64 in FIFO order relative to a write-related array request directed to the same target sector-row. A subsequent array request directed to the same target sector-row is inserted following the read-related array request in FIFO order. This ordering ensures that write I/O requests issued after a read I/O request do not update any data required by the read I/O request until after the read I/O request has been issued. After a given subrequest is transferred to a corresponding array request in the active queue 64, the given subrequest is deleted from the pending queue 62.

The active queue 64 is a data storage means used to implement a list arranged in sector-row order. In the preferred embodiment, the active queue 64 is a double linked-list residing within RAM 14, its storage capacity being dynamically allocated and deallocated according to the number of array requests that have yet to be issued by the request modification memory 60 at any given moment. Those skilled in the art will recognize that an active queue 64 having a permanent, fixed size is possible in an alternate embodiment of the present invention. Each entry in the active queue 64 is an array request created by the request modification memory 60 from one or more pending queue subrequests. Referring now to FIG. 5, a block diagram of a preferred embodiment of the structure for an active queue entry or array request is shown. Each active queue entry comprises: a pointer to the next active queue element; a pointer to the previous active queue element; the target sector-row address to which the array request is directed; a flag indicating whether the array request is a read or a write operation; the number of disk drives 29 within the target stripe that will receive an entire sector-row of data; a flag for each disk drive 29 in the disk array 26 indicating whether an entire sector-row of data is to be written; the location within the target stripe at which the array request is to begin; the location within the target stripe at which the array request is to end; the number of disk drives 29 within the disk array 26 that the array request will read from or write to; a map of sectors to be written for each disk drive 29 in the disk array 26; and a set of pointers to each virtual disk I/O request stored in RAM 14 that has been combined into this active queue entry.

When the active queue 64 contains more than a predetermined number of elements or array requests, the request modification memory 60 issues each array request in the active queue 64 to the disk array 26. In the preferred embodiment, the request modification memory 60 also issues each array request in the active queue 64 to the disk array 26 when a predetermined wait time has been exceeded. This ensures that array requests are issued in a timely manner in the event that the predetermined number of array requests is never reached. The request modification memory 60 maintains an active queue head structure that indicates the location of a first array request in the active queue 64, the total number of array requests in the active queue 64, and a next removal pointer to indicate the location of the next array request that is to be issued to the disk array 26. After issuance of the array request indicated by the next removal pointer, the request modification memory 60 advances the next removal pointer to the next successive array request and deletes the array request that was previously issued.

If the active queue 64 contains more than the predetermined number of array requests, or if the predetermined wait time has been exceeded, the request modification memory 60 determines if the array request indicated by the next removal pointer corresponds to a read operation. If so, the request modification memory 60 issues the array request to the disk array 26, thereby obtaining the required data. The request modification memory 60 then advances the next removal pointer to the next successive array request, and deletes the array request that had just been issued.

If the array request indicated by the next removal pointer corresponds to a write operation, the request modification memory 60 determines whether any disk drive 29 in the target stripe associated with the target sector-row is to receive more than one set of data when the array request is written. In other words, the request modification memory 60 determines whether the array request contains multiple write operations directed to any single disk drive 29. If not, the request modification memory 60 moves the data to be written from the location in RAM 14 indicated by the virtual disk I/O request into the span buffer 69. The span buffer 69 is a data storage means for holding the data to be written to each disk drive 29 in the target stripe. The span buffer 69 comprises one or more temporary buffers, where each temporary buffer is associated with a disk drive 29 to which data is to be written. In the preferred embodiment, each temporary buffer and hence the span buffer 69 is dynamically allocated, thereby eliminating the need for maintaining a large amount of dedicated storage.

If two or more write operations in an array request are directed to a given disk drive 29, the request modification memory 60 determines whether the data sets to be written to the given disk drive are contiguous. If so, the request modification memory 60 transfers each data set to be written to the given disk drive 29 into the span buffer 69 in order of the first-received virtual disk write request to the last-received virtual disk write request. This ensures that the contents of the span buffer 69 are current with the last-received virtual disk write request when two or more write requests directed to the given disk drive 29 overlap.

When two or more data sets within an array request are to be written to a given disk drive 29 and one or more portions of the data sets are not contiguous, the request modification memory 60 determines the total span of the data sets to be written to the given disk drive 29. The total span is given by the highest address at which data will be written to the given disk drive 29 minus the lowest address at which data will be written to the given disk drive. The request modification memory 60 then performs a preread operation in which the span buffer 69 is loaded with the data stored on the given disk drive 29 that lies within the total span. Once the data within the total span has been transferred from the given disk drive 29 into the span buffer 69, the request modification memory 60 copies the data sets to be written to the given disk drive 29 into the span buffer 69 at the appropriate locations within the total span. Updated data is therefore copied over old data within the total span. When the data sets to be written to the given disk drive are copied into the span buffer 69, they are copied in order of the first-received virtual disk write request to the last received virtual disk write request. This ensures that if any portions of the data sets to be written are contiguous, the data that will be written to the given disk drive 29 is consistent with the most-recent virtual disk write request directed to the given disk drive's target sector-row.

The request modification memory 60 performs the above operations for each disk drive 29 to which data will be written when the array request is issued to the disk array 26. Once each temporary buffer within the span buffer 69 contains updated data for each disk drive 29 to which data will be written in the array request, the request modification means 60 issues a read-modify-write RAID type write operation for the data within the span buffer 69. In the read-modify-write RAID type write operation, the request modification means 60 loads data stored on one or more disk drives 29 within the target stripe into the stripe buffer 66. Which disk drives 29 are involved in this operation depends upon whether a long write or a short write is to be performed, and upon the number of subrequests that have been merged into the array request. The stripe buffer 66 is a data storage means residing within RAM 14 comprising one or more temporary buffers. Each temporary buffer within the stripe buffer 66 corresponds to a disk drive 29 within the disk array 26 from which stored data is required for updating parity information. In the preferred embodiment, each temporary buffer and hence the stripe buffer 66 is dynamically allocated and deallocated depending upon the number of disk drives 29 from which stored information is to be retrieved prior to updating parity information. If a RAID 5 long write operation is required, the number of temporary buffers within the stripe buffer 66 equals one less than the number of disk drives 29 within the disk array 26. When a RAID 5 short write operation is required, the number of temporary buffers equals the number of disk drives 29 to which new or updated data is to be written. Those skilled in the art will recognize that a stripe buffer 66 having a fixed size is possible in an alternate embodiment.

The request modification memory 60 also updates the parity information corresponding to the target stripe when a read-modify-write RAID type write operation is issued. The request modification memory 60 uses the parity buffer 68 when performing the parity information update. The parity buffer 68 is preferably a data storage means residing within RAM 14. In the preferred embodiment, the parity buffer is dynamically allocated and deallocated depending upon the amount of parity information to be written to the parity drive during the read-modify-write RAID 5 write operation. If a long RAID 5 write operation is required, the request modification memory 60 computes new parity information through an XOR operation between the data stored in the span buffer 69 and the data stored in the stripe buffer 66. The parity information resulting from the XOR operation is stored in the parity buffer 68. In this case, the storage capacity allocated to the parity buffer 68 is an entire sector-row of data.

If a short RAID 5 write operation is required, the request modification memory 60 loads the parity buffer 68 with the parity information stored on the parity drive corresponding to the new or updated data that is to be written to the target stripe. The request modification memory 60 then performs a first XOR operation between the data within the span buffer 69 and the corresponding data within the stripe buffer 66. The request modification memory 60 next obtains the updated parity information by performing a second XOR operation between the result of the first XOR operation and the contents of the parity buffer 68, storing the result back in the parity buffer 68. Those skilled in the art will recognize that in an alternate embodiment, the parity buffer 68 can be a data storage means of fixed size.

After the request modification memory 60 performs the appropriate type of parity update for a RAID type write using the contents of the stripe buffer 66, the span buffer 69, and the parity buffer 68, the request modification memory 60 issues individual write commands to disk drives 29 within the disk array 26. The issuance of the individual write commands causes the contents of the parity buffer 68 and the contents of the span buffer 69 to be written to the appropriate disk drives 29 within the target stripe corresponding to the array request's target sector-row. The contents of the parity buffer 68 are stored on the parity drive for the target stripe.

An array request corresponding to a write operation is formed from at least one and in general multiple virtual disk write requests. Instead of directly issuing each virtual disk write request received, the system 10 of the present invention advantageously combines virtual disk write requests directed to a given target sector-row into a single corresponding array request. Thus, instead of requiring a read-modify-write RAID type write operation for each of its constituent virtual disk write requests, each array request corresponding to a write operation requires a single read-modify-write RAID 5 type write operation. This in turn results in a significant time savings over the prior art because operations involving disk drive accesses are typically among the slowest operations performed in the execution of an application program.

Figure 6:
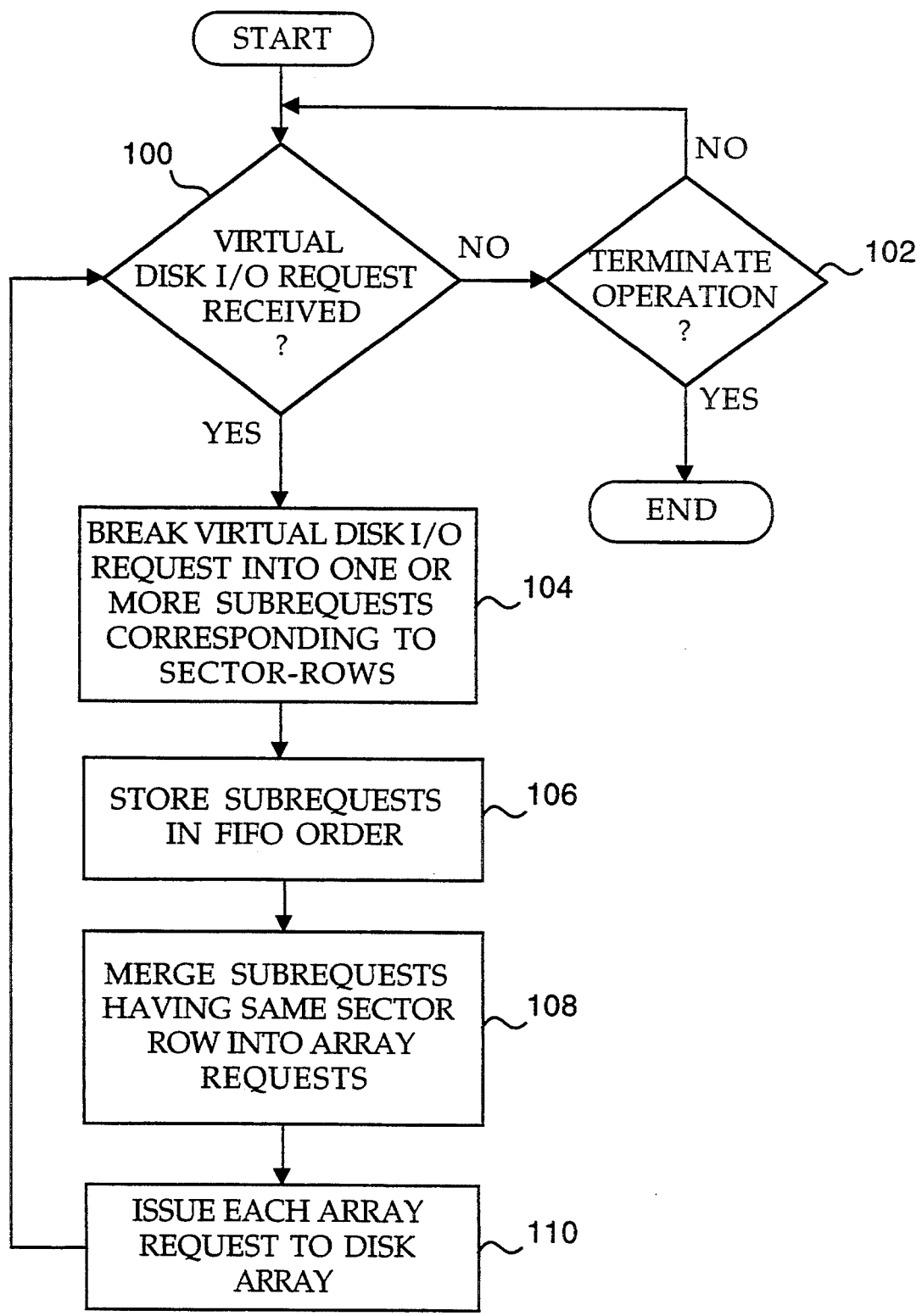
FIG. 6 is a flowchart of a preferred method for storing data to and retrieving data from a disk array according to the present invention.

Referring now to FIG. 6, a flowchart of a preferred method for managing requests directed to a RAID 5 disk array is shown. The preferred method begins in step 100 by testing whether a virtual disk I/O request has been received. If not, the method next tests in step 102 whether the request modification memory's operation is to be terminated. If so, the preferred method ends. If operation is to continue, the preferred method returns to step 100. If a virtual disk I/O request has been received in step 100, the preferred method next breaks the virtual disk I/O request into one or more subrequests according to the virtual disk I/O request type, the length of the virtual disk I/O request, and the storage capacity of a sector-row in step 104. Next, in step 106, the preferred method stores the subrequests created in step 104 in FIFO order in the pending queue 62. Following step 106, the preferred method merges each subrequest directed to a common sector-row into a corresponding array request and stores them in the active queue 64 in step 108. Finally, in step 110, the preferred method issues each array request as a RAID type operation. Those skilled in the art will recognize that the steps of breaking the virtual disk I/O request into one or more subrequests, storing subrequests in the pending queue, merging stored subrequests into corresponding array requests, and issuing array requests can be performed simultaneously and independently.

Figure 7A:
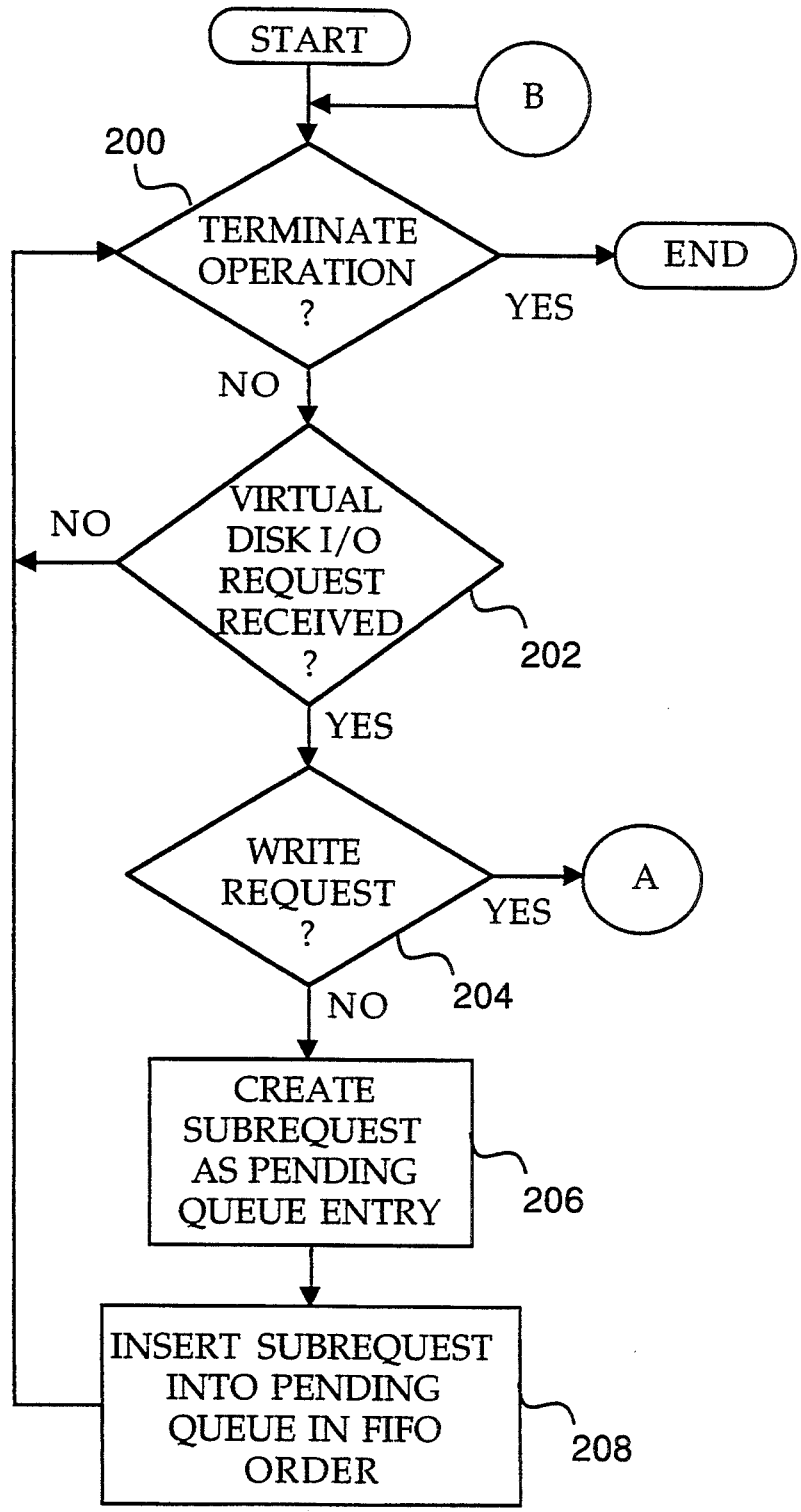
FIGS. 7A and 7B are a flowchart of a preferred method for creating a subrequest in accordance with the present invention.
Figure 7B:
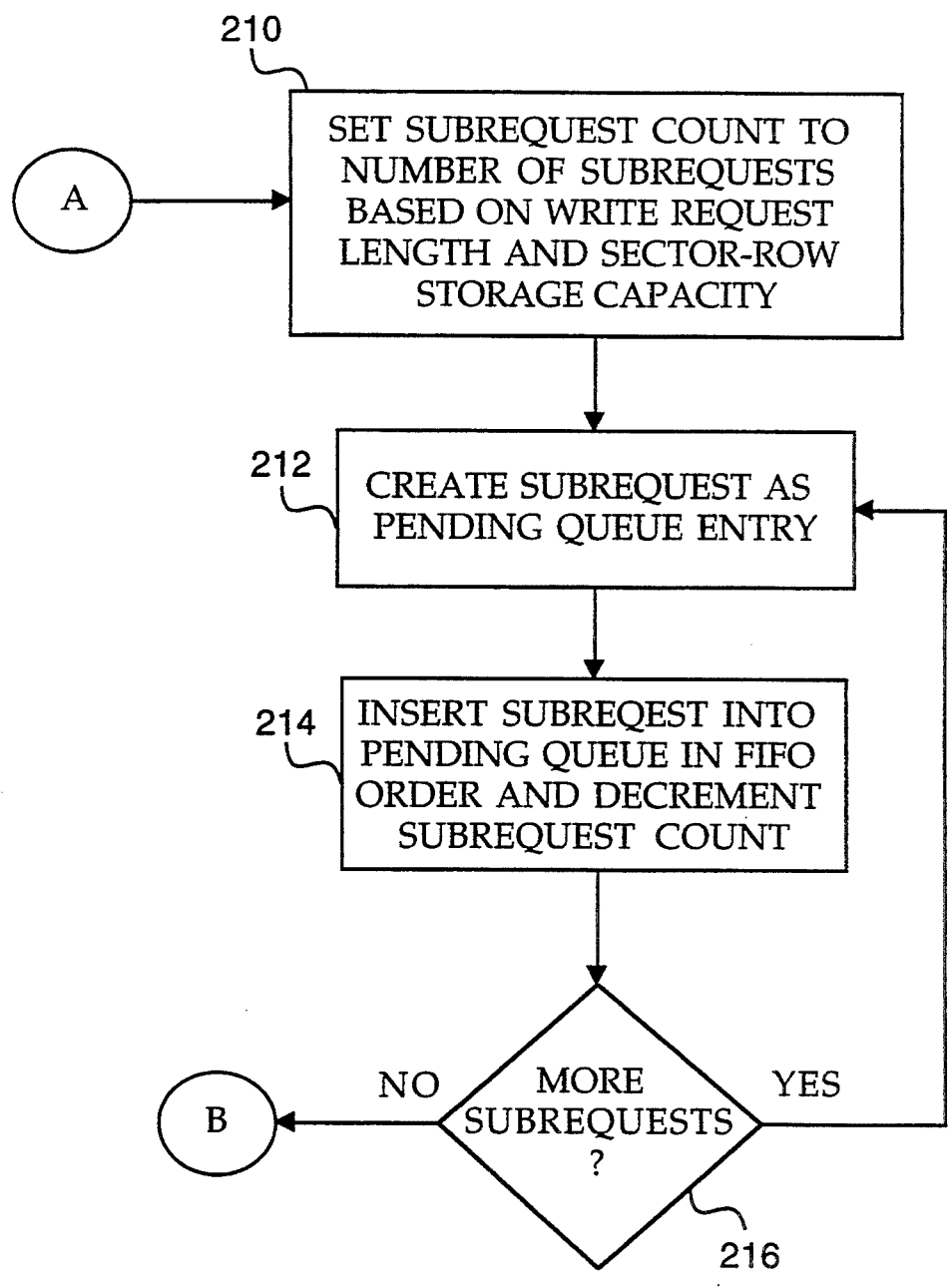

Referring now to FIGS. 7A and 7B, a flowchart of a preferred method for subrequest creation is shown. The method begins in step 200, with a determination of whether operation is to terminate. If so, the method ends. If operation is to continue in step 200, the method next proceeds to step 202 and determines whether a virtual disk I/O request has been received. If not, the method returns to step 200. If a virtual disk I/O request has been received in step 202, the method next determines in step 204 whether the virtual disk I/C) request is a write operation. If not, the virtual disk I/O request is a read operation, and the method proceeds to step 206 and creates a single subrequest for the read operation. The subrequest is created as a pending queue entry according to the structure given in FIG. 4. The method next inserts the subrequest into the pending queue 62 in FIFO) order in step 208, after which operation returns to step 200.

If it was determined in step 204 that the virtual disk I/C) request received is a write operation, the method proceeds to step 210 and sets a subrequest count to the number of subrequests the virtual disk write request requires. The subrequest count is determined by dividing the length of the virtual disk write request by the storage capacity of a sector-row, where any fractional result obtained rounds the number of subrequests required up to the next-higher integer. Next, in step 212, the method creates a subrequest, where the subrequest is a pending queue entry having the structure given in FIG. 4. Following step 212, the method inserts the subrequest into the pending queue 62 in FIFO) order and decrements the subrequest count in step 214. Following step 214, the method tests the value of the subrequest count in step 216 to determine whether additional subrequests are to be created for the virtual disk write request received. If not, the method returns to step 200. If it is determined in step 216 that additional subrequests are to be created, the method returns to step 212.

Figure 8A:
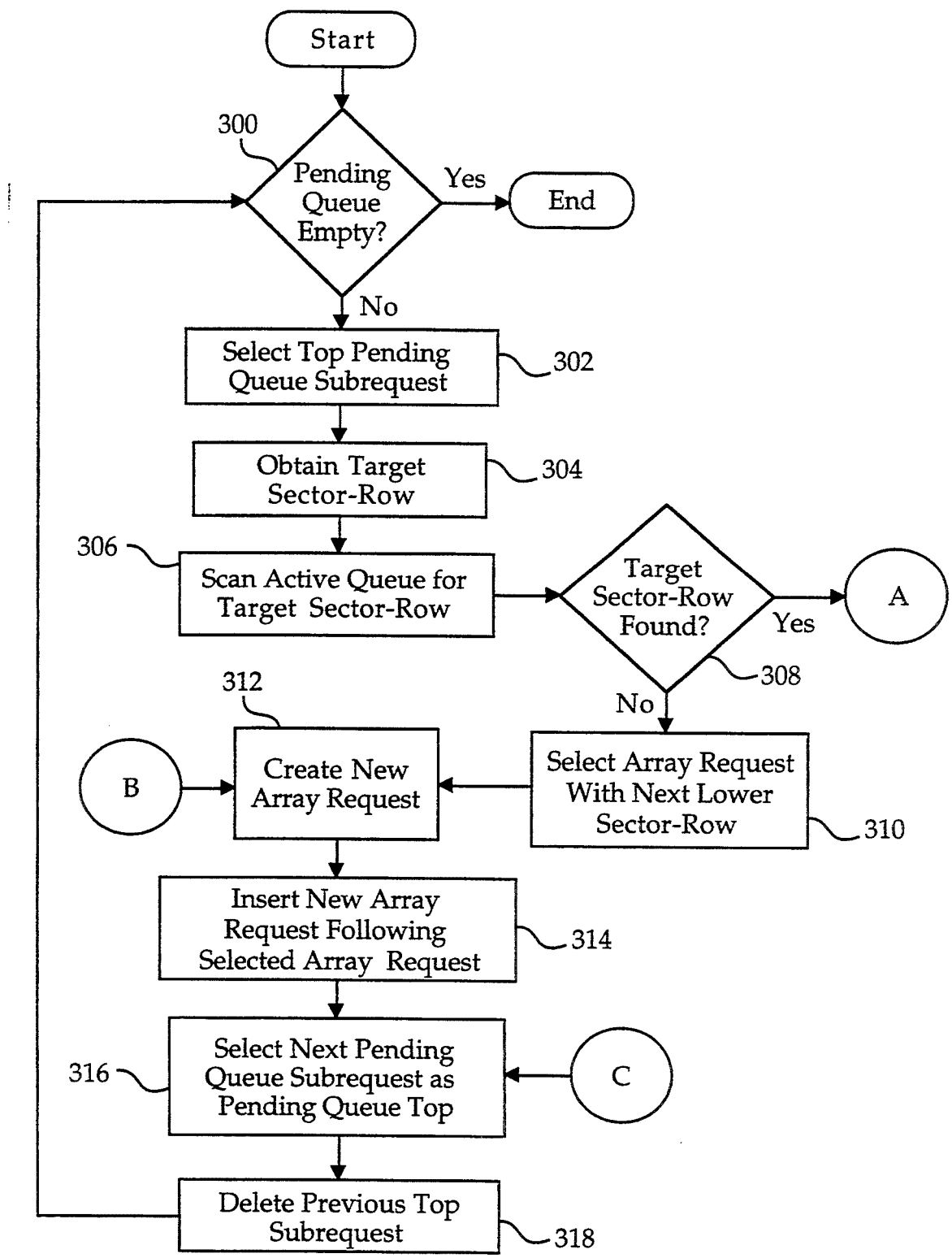
FIGS. 8A and 8B are a flowchart of a preferred method for inserting pending queue subrequests into the active queue of the present invention.
Figure 8B:
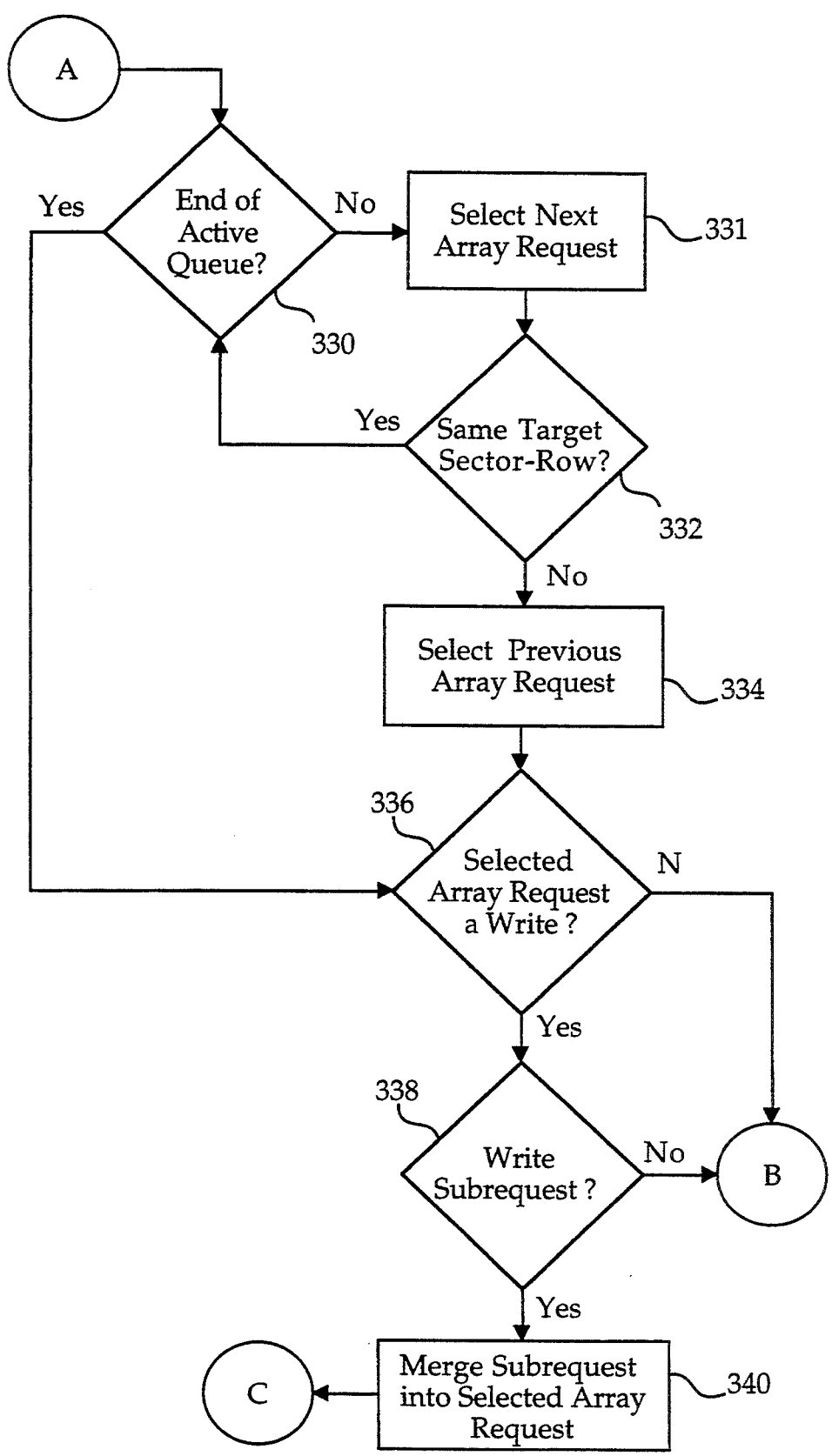

Referring now to FIGS. 8A and 8B, a flowchart of a preferred method for insertion of pending queue subrequests into the active queue 64 is shown. The method begins in step 300 by testing whether the pending queue 62 is empty. If so, the method ends. If it is determined in step 300 that the pending queue 62 is not empty, the method proceeds to step 302 and selects the top pending queue subrequest. Next, in step 304, the method obtains the selected pending queue subrequest's target sector-row. The method then scans the array requests in the active queue 64 for the target sector-row in step 306. The method next tests whether the target sector-row was found in step 308. If the target sector-row is not found, the method selects the array request in the active queue 64 having the next lowest sector-row relative to the target sector-row in step 310. Following step 310, the method creates a new array request for the selected subrequest in step 312. The new array request is a pending queue entry having the structure given in FIG. 5. Next, in step 314, the method inserts the new array request into the active queue 64 following the array request that was selected in step 310. Steps 310 through 314 serve to insert the new combined subrequest into the active queue in sector-row order. If no array request having a lower numbered sector-row exists in step 310, the method simply inserts the new array request as the first element in the active queue 64. After step 314, the method selects the next successive pending queue subrequest as the top of the pending queue 62 in step 316. Next, in step 318, the method deletes the subrequest that was previously defined to be the pending queue top. Following step 318, the method returns to step 300.

If the target sector-row is found in step 308, the method proceeds to step 330 and determines whether the currently-selected array request is the end of the active queue 64. If not, the method selects the next successive array request in the active queue 64 in step 331. Next, the method tests in step 332 whether the sector-row of the selected array request is the same as the target sector-row. If so, the method returns to step 330. If the sector-row of the selected array request is not the same as the target sector-row, the method selects the previous array request in step 334 as the array request under consideration. Steps 330 through 334 serve to sequentially locate the last array request in the active queue 64 having the same target sector-row as the top pending queue subrequest. If the last array request having the same target sector-row is a read operation, the top pending queue subrequest should be incorporated into the active queue 64 as a new array request. If the last array request having the same target sector-row is a write operation, the top pending queue subrequest is to be merged into the last array request if the top pending queue subrequest is a write subrequest. Otherwise, the top pending queue subrequest is a read subrequest and should be incorporated into the active queue 64 as a new array request.

Following step 334, or if it is determined in step 330 that the selected array request is at the end of the active queue 64, the method proceeds to step 336 and tests whether the selected array request is a write operation. If not, the selected array request is a read operation, and the selected subrequest should therefore be inserted following the selected array request. Therefore, the method next proceeds to step 312 when the selected array request is not found to be a write operation in step 336. If step 336 indicates that the selected array request is a write operation, the method next tests whether the selected subrequest is a write operation in step 338. If the selected subrequest is not a write operation, the method proceeds to step 312. If the method determines in step 338 that the selected subrequest is a write operation, the method merges the selected subrequest into the currently-selected array request in step 340. Steps 338 and 340 ensure that only a write subrequest will be merged into the array request write operation for the same target sector-row. Following step 340, the method returns to step 316.

Figure 9A:
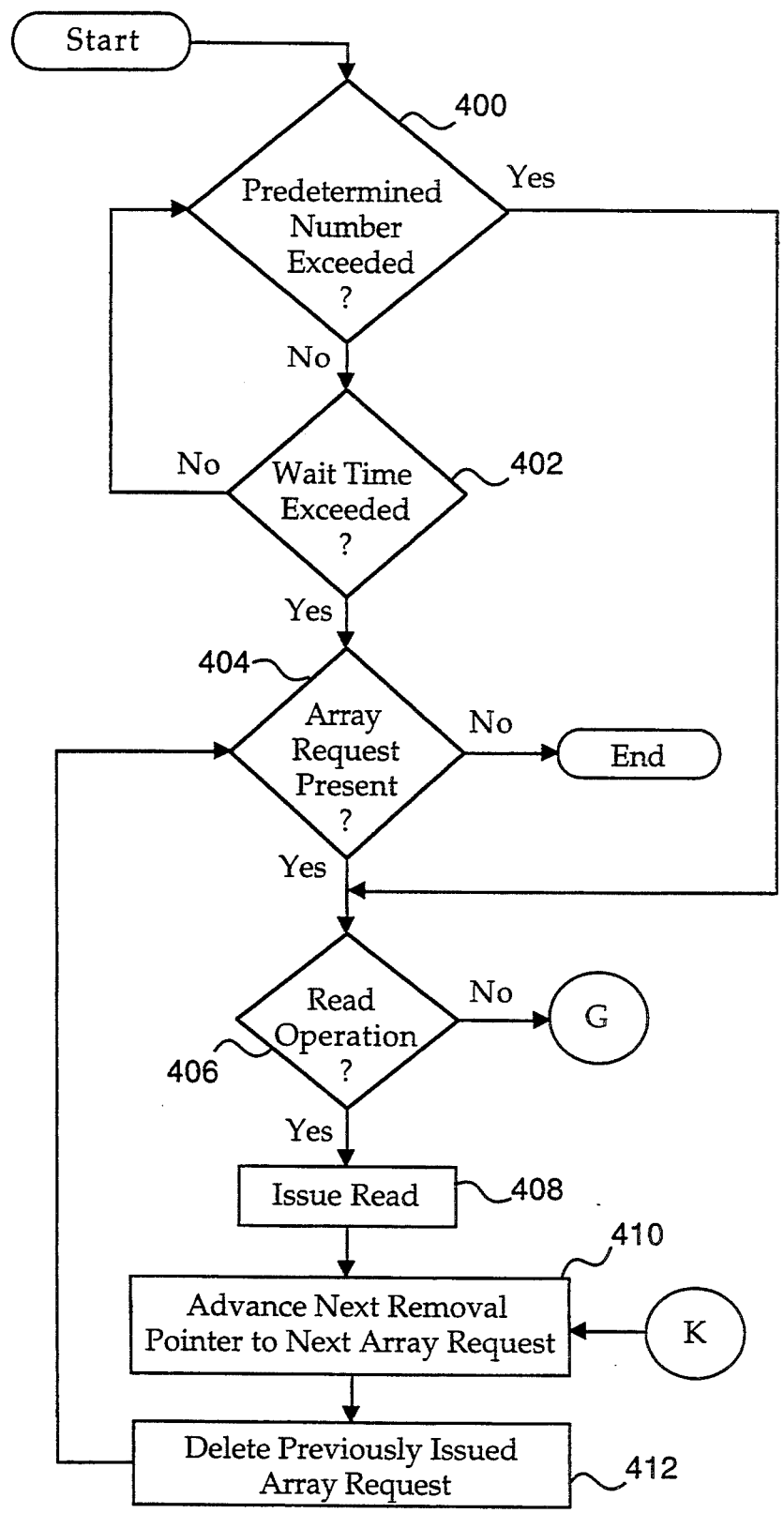
FIGS. 9A, 9B, and 9C are a flowchart of a preferred method of the present invention for issuing active queue array requests.
Figure 9B:
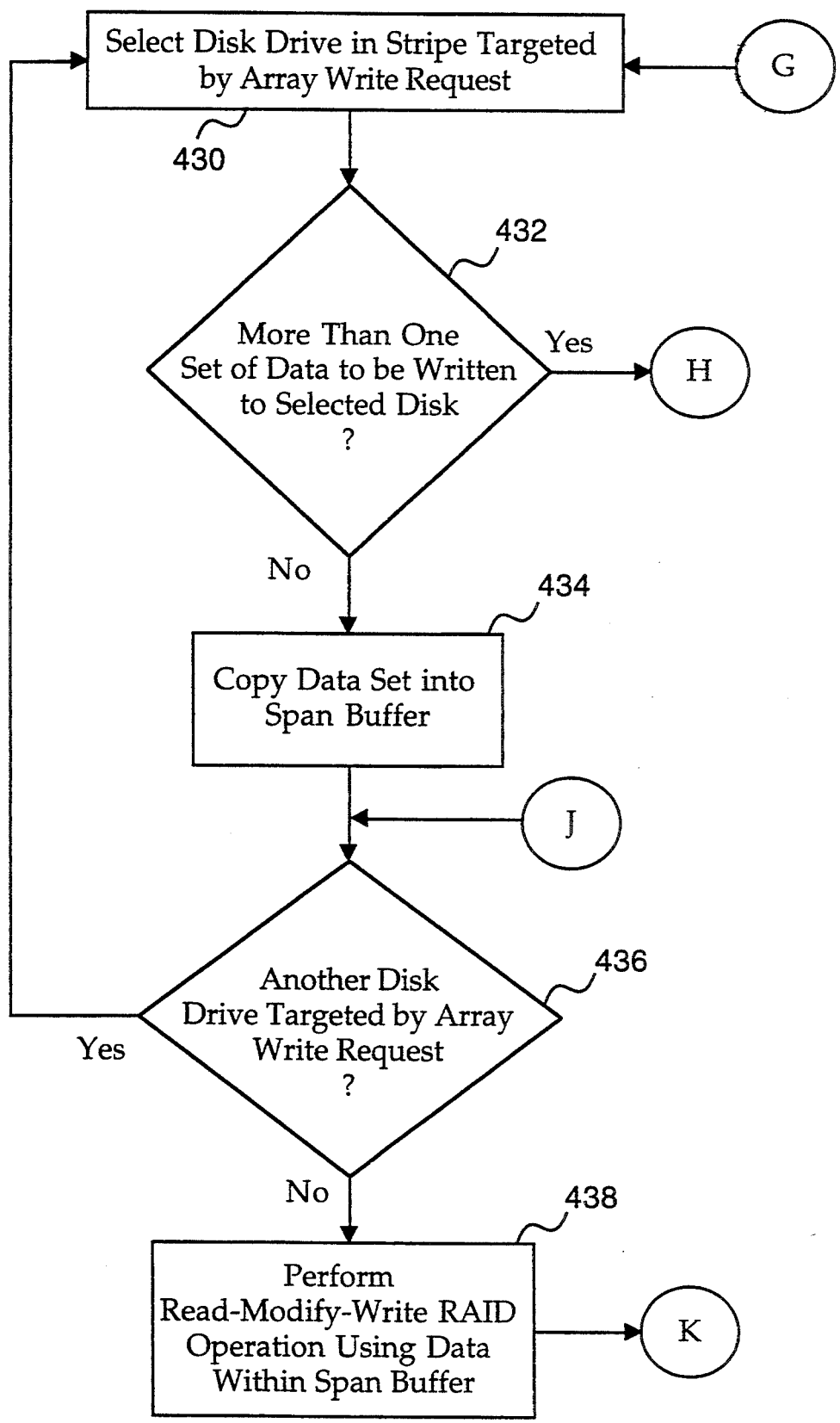
Figure 9C:
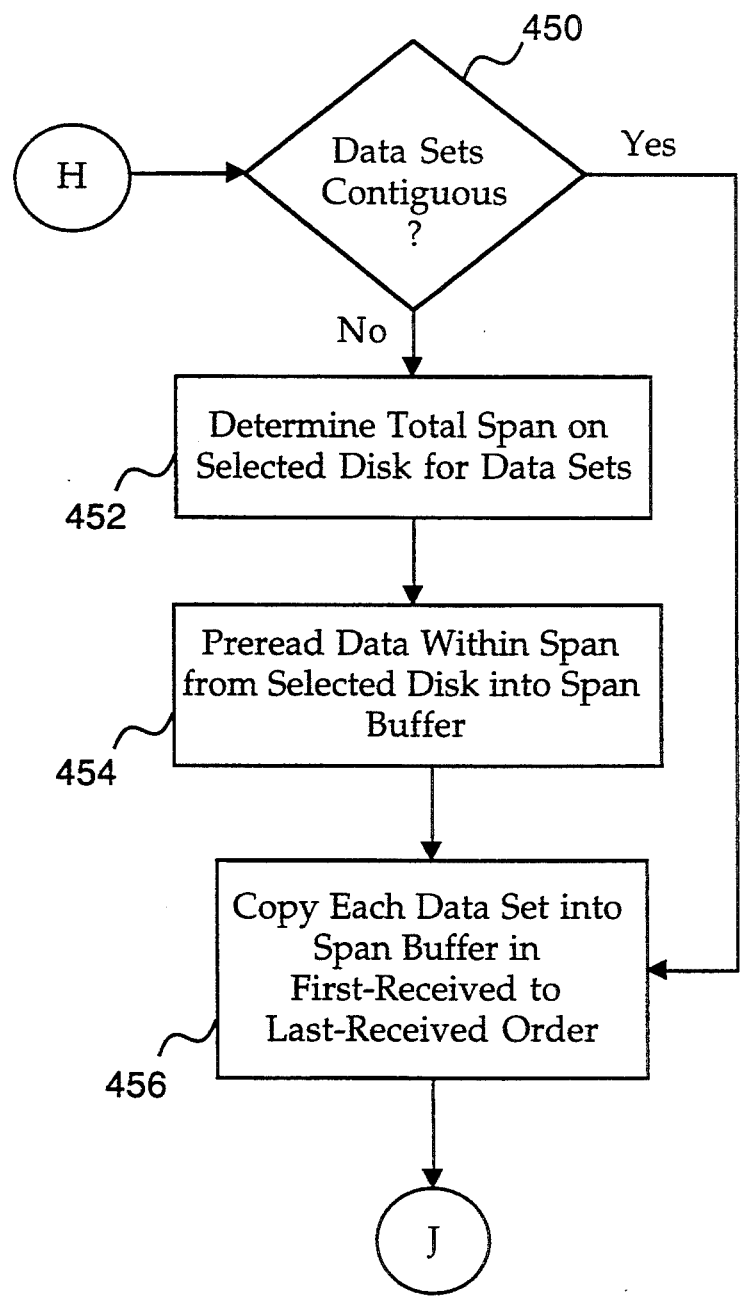

Referring now to FIGS. 9A, 9B, and 9C, a flowchart of a preferred method for issuing of array requests is shown. The method begins in step 400 by testing whether the active queue 64 contains more than a predetermined number of array requests. In the preferred embodiment, the request modification memory 60 maintains a counter that indicates the number of array requests present in the active queue 64. If the number of array requests in the active queue 64 does not exceed the predetermined number, the method proceeds to step 402 and determines whether the predetermined wait time has been exceeded. The predetermined wait time ensures that array requests in the active queue 64 are issued in the event that the predetermined number of array requests is never exceeded. If the predetermined wait time has not been exceeded, the method returns to step 400. If step 402 indicates that the predetermined wait time has been exceeded, the method next tests in step 404 whether array requests are present in the active queue 64. If not, the method ends.

If the number of array requests present in the active queue 64 exceeds the predetermined number in step 400, or if step 404 indicates that array requests are present in the active queue 64, the method proceeds to step 405 and selects the array request indicated by the next removal pointer. Next, in step 406, the method tests whether the selected array request is a read operation. If so, the method issues the read operation to the disk array 26 in step 408, thereby obtaining the required data. Following step 408, the method advances the next removal pointer in step 410 to the array request immediately following the array request that had just been issued. The method then deletes the previously-issued array request from the active queue 64 in step 412. Following step 412, the method proceeds to step 404.

If it is determined in step 406 that the array request indicated by the next removal pointer is a write operation rather than a read operation, the method selects a disk drive 29 to which information will be written in the target stripe corresponding to the target sector-row in step 430. The method then tests in step 432 whether more than one set of data in the array request is directed to the selected disk drive 29. If only one set of data is to be written to the selected disk drive 29, the method moves the data to be written to the selected disk drive 29 into the span buffer in step 434. Next, the method determines in step 436 if another disk drive 29 within the target stripe is to receive data as a result of the array request. If so, the method returns to step 430.

If the method determines in step 432 that more than one set of data is to be written to the selected disk drive 29, the method proceeds to step 450. In step 450, the method determines whether the data sets to be written to the selected disk drive 29 are contiguous. If the data sets are contiguous, the method copies each data set to be written to the selected disk drive 29 into the span buffer 69 in step 456, in order of the first-received virtual disk write request to the last-received virtual disk write request that form the array request under consideration. This ensures that the data within the span buffer 69 is consistent with the times at which each virtual disk write request was received. If it is determined in step 450 that the data sets to be written to the selected disk drive 29 are not contiguous, the method determines the total span of the data sets in step 452. The total span is calculated by subtracting the lowest address at which data is to be written to the selected disk drive 29 from the highest address at which data is to be written to the selected disk drive 29. The method next performs a preread operation in which the data on the selected disk drive 29 that occupies the total span is read into the span buffer 69. Next, the method copies each data set to be written to the selected disk drive 29 into the span buffer 69 in step 456, where each data set is copied in order of the first-received virtual disk write request to the last-received virtual disk write request within the array request under consideration. Operation then continues in step 436.

If in step 436 the method determines that no other disk drive is to receive data as a result of the array request under consideration, the method next issues the array request as a read-modify-write RAID type write operation in step 438. In step 438, the data to be written to the disk drive or drives 29 within the target stripe resides in the span buffer 69. Prior to writing the contents of the span buffer 69 to the appropriate disk drives 29, the parity information is updated according to standard RAID methods using the contents of the span buffer 69 and information already stored on one or more disk drives 29 within the target stripe. Following step 438, the method proceeds to step 410.

Referring now to FIGS. 10A, 10B, and 10C, an exemplary set of virtual disk I/O requests and their processing by the present invention is shown. In the example of FIGS. 10A, 10B, and 10C, the disk array 26 within the system of the present invention is defined to have six disk drives 29 arranged in a RAID 5 configuration. Each sector-row is defined to have a storage capacity of 16 kbytes. Five disk drives 29 are used to store data across a given stripe, and one disk drive 29 is used to store parity information. Thus, each stripe stores a total of 80 kbytes of data.

The virtual disk I/O requests listed in FIG. 10A are listed in order of their time of receipt. Throughout this example, virtual disk addresses are taken to be byte addresses for simplicity. The first virtual disk I/O request is a write request for 12 kbytes, beginning at virtual disk address 160k. The second virtual disk I/O request is a read request for 40 kbytes, beginning at virtual disk address 180k. The third virtual disk I/O request is a write request for 20 kbytes, beginning at virtual disk address 192k. The final virtual disk I/O request is a write request for 16 kbytes, beginning at virtual disk address 220k.

Referring now to FIG. 10B, the pending queue 62 subrequests created from the set of virtual disk I/O requests of FIG. 10A are shown. In the present example, it is assumed that the pending queue 62 is initially empty. Upon receipt of the first virtual disk I/O request, the request modification memory 60 determines that the first virtual disk I/O request is a write request for 12 kbytes. Since the storage capacity of a sector-row is 16 kbytes, the request modification memory 60 creates a single pending queue subrequest for the first virtual disk I/O request. The subrequest has the form given in FIG. 4. Virtual disk address 160 k is specified by the first virtual disk I/O request. Since five disk drives 29 within a stripe are used to store data, stripe 1, or equivalently, sector-row 1, is associated with virtual disk addresses 0 through 79k. Sector-row 2 is associated with virtual disk addresses 80k through 159k, and sector-row 3 is associated with virtual disk addresses 160k through 239k. Thus, the request modification memory 60 assigns sector-row 3 to the subrequest. The request modification memory 60 inserts the single subrequest into the top of the pending queue 62.

Since the second virtual disk I/O request is a read request, the request modification memory 60 creates a single read subrequest. As the second virtual disk I/O request specified virtual disk address 180k, the request modification memory 60 determines that this also targets sector-row 3, and assigns sector-row 3 to the read subrequest. The request modification memory 60 inserts the read subrequest into the second position in the pending queue 62.

When processing the third virtual disk I/O request, the request modification memory 60 determines that writing 20 kbytes of data requires two subrequests. The request modification memory 60 creates a first subrequest for the first 16 kbytes of data to be written, and creates a second subrequest for the remaining 4 kbytes of data to be written. Since the third virtual disk I/O request is directed to virtual disk address 192k, the request modification memory 60 assigns sector-row 3 to both subrequests created for the third virtual disk I/O request. The first subrequest created corresponds to data to be written beginning at virtual disk address 192k, and the second subrequest created corresponds to data to be written beginning at virtual disk address 208k. The request modification memory 60 inserts the first and second subrequests created for the third virtual disk I/O request into the third and fourth positions in the pending queue 62, respectively.

The fourth virtual disk I/O request is a write request for 16 kbytes of data. Although a maximum of 16 kbytes of data can be written to a single disk drive 29 in the present example, the request modification memory 60 determines that the virtual disk address given in the fourth virtual disk I/O request requires that the 16 kbytes be written across two disk drives 29 in the disk array 26. The request modification memory 60 therefore creates first and second subrequests corresponding to the fourth virtual disk I/O request. The data corresponding to the first subrequest is to be written beginning at virtual disk address 220, and the data corresponding to the second subrequest is to be written beginning at virtual disk address 224. The request modification memory 60 assigns sector-row 3 to both subrequests created, and inserts the two subrequests into the fifth and sixth positions in the pending queue 62.

Referring now to FIG. 10C, the manner in which the pending queue subrequests of FIG. 10B are combined into active queue array requests is shown. In the present example, it is assumed that the active queue 64 is initially empty. The request modification memory 60 selects the top pending queue subrequest, and determines that no array requests currently exist in the active queue 64 directed to sector-row 3. The request modification memory 60 then creates an array request corresponding to the top pending queue subrequest, and inserts this array request into the active queue 64. The request modification memory 60 then identifies the next successive pending queue subrequest as the top of the pending queue 62, and deletes the subrequest that was previously at the top of the pending queue 62.

At this point, the read subrequest is at the top of the pending queue 62. The request modification memory 60 selects the read subrequest, and obtains sector-row 3 as its target sector-row. The request modification memory 60 scans the active queue 64 for an array request directed to sector-row 3. Since the previously-inserted write-related array request directed to sector-row 3 is the only array request present in the active queue 64 at this point, the request modification memory 60 creates a new array request corresponding to the read subrequest and inserts the new array request following the write-related array request. The request modification memory 60 then identifies the next successive pending queue subrequest as the top of the pending queue 62, and deletes the subrequest that was previously at the top of the pending queue 62.

At this point, the subrequest at the top of the pending queue 62 is the first of the two subrequests created as a result of the third virtual disk I/O request shown in FIG. 10A. As this subrequest is directed to sector-row 3, the request modification memory 60 sequentially scans the active queue 64 for an array request directed to sector-row 3. Upon finding an array request directed to sector-row 3, the request modification memory 60 sequentially determines the position of the last array request directed to sector-row 3. The last array request directed to sector-row 3 is the previously-inserted read-related array request, and the subrequest currently at the top of the pending queue is a write subrequest. Therefore, the request modification memory 60 creates a new array request corresponding to the top pending queue subrequest, and inserts the new array request into the active queue 62 following the previously inserted read-related array request. The request modification memory 60 then identifies the next successive pending queue subrequest as the top of the pending queue 62, and deletes the subrequest that was previously at the top of the pending queue 62.

The top pending queue subrequest is now the second subrequest created as a result of the third virtual disk I/O request. The request modification memory 60 sequentially scans the active queue 64 for the first array request directed to sector-row 3. Upon finding this array request, the request modification memory 60 next locates the last sequential array request in the active queue 64 directed to sector-row 3. The last sequential array request directed to sector-row 3 corresponds to a write operation. Thus, the request modification memory 60 merges the top pending queue subrequest into the last sequential array request directed to sector-row 3 since both correspond to write operations. The request modification memory 60 then identifies the next successive pending queue subrequest as the top of the pending queue 62, and deletes the subrequest that was previously at the top of the pending queue 62.

At this point, the top pending queue subrequest is the first subrequest created as a result of the fourth virtual disk I/O request. The request modification memory 60 sequentially scans the active queue for an array request directed to sector-row 3. Upon finding the first array request directed to sector-row 3, the request modification memory 60 next sequentially locates the last array request in the active queue 64 directed to sector-row 3. The last array request directed to sector-row 3 corresponds to a write operation. Thus, the request modification memory 60 merges the top pending queue subrequest into the last array request directed to sector-row 3 since both correspond to write operations. The request modification memory 60 then identifies the next successive pending queue subrequest as the top of the pending queue 62, and deletes the subrequest that was previously at the top of the pending queue 62.

The top pending queue subrequest at this point is the second subrequest created as a result of the fourth virtual disk I/O request. As the top pending queue subrequest is directed to sector-row 3, the request modification memory 60 sequentially scans the active queue 64 for an array request directed to sector-row 3. After finding an array request directed to sector-row 3, the request modification memory 60 next sequentially locates the last array request directed to sector-row 3. The last array request directed to sector-row 3 corresponds to a write operation. The request modification memory 60 therefore merges the top pending queue subrequest into the last array request directed to sector-row 3 since both correspond to write operations. The request modification memory 60 then recognizes that the pending queue 62 does not contain additional subrequests, and deletes the subrequest at the top of the pending queue 62. At this point, the pending queue 62 is empty.

As can be seen from FIGS. 10A, 10B, and 10C, the third and fourth virtual disk I/O requests have been combined into a single array request in active queue element 3. The time required to perform the single write operation associated with active queue element 3 is approximately one-half of the time required to individually perform the third and fourth virtual disk I/O requests. If additional virtual disk I/O requests corresponding to write operations directed to sector-row 3 are received after virtual disk request 4, these will also be combined into active queue element 3. This in turn would further increase the time savings realized by the present invention over the prior art. For example, if a fifth and a sixth virtual disk I/O request corresponding to write operations directed to sector-row 3 are received, the present invention would perform the write operations corresponding to the third through sixth virtual disk I/O requests in approximately one-fourth of the time required to individually perform the third, fourth, fifth, and sixth virtual disk I/O requests.

While the present invention has been described with reference to certain preferred embodiments, those skilled in the art will recognize that various modifications may be provided. For example, rather than implementing the present invention as a device driver corresponding to a virtual disk, the present invention could be implemented such that the operating system 18 interacted with the invention as a disk drive or as a disk drive controller. These and other variations upon and modifications to the preferred embodiments are provided for by the present invention, which is limited only by the following claims.

What is claimed is:

1. A system for disk array I/O request management comprising:
   a processing unit having an input and an output, for executing steps in an application program requiring one or more I/O operations;
   a memory having an input and an output for storing data corresponding to an I/O request, the input of the memory coupled to the output of the processing unit and the output of the memory coupled to the input of the processing unit;

a disk array having an input and an output for receiving data from and writing data to the memory, the input of the disk array coupled to the output of the memory, the output of the disk array coupled to the input of the memory;

a request modification means having an input and an output, the input of the request modification means coupled to the output of the processing unit and to the output of the memory, the output of the request modification means coupled to the input of the disk array, the request modification means creating a set of subrequests from an I/O request, each subrequest created according to an I/O request type, an I/O request length, and sector row storage capacity, combining subrequests into a set of array requests, and issuing array requests to the disk array.

2. The system of claim 1, further comprising:

a pending queue having an input and an output, the input of the pending queue coupled to the output of the request modification means, the pending queue storing subrequests created from an I/O request; and an active queue having an input and an output, the input of the-active queue coupled to the output of the pending queue, the output of the active queue coupled to the output of the request modification means, the active queue storing array requests created from pending queue subrequests.

3. The system of claim 2, further comprising:

a parity buffer having an input and an output, the input of the parity buffer coupled to the output of the disk array, the output of the parity buffer coupled to the input of the disk array, the parity buffer storing parity information corresponding to a block of data to be written to the disk array;

a stripe buffer having an input and an output, the input of the stripe buffer coupled to the output of the disk array, the output of the stripe buffer coupled to the input of the parity buffer, the stripe buffer storing data residing upon the disk array; and a span buffer having an input and an output, the input of the span buffer coupled to the output of the disk array, the output of the span buffer coupled to the input of the disk array, the span buffer storing data to be written to the disk array.

4. The system of claim 3, wherein the parity buffer comprises a dynamically allocated temporary buffer.

5. The system of claim 3, wherein the stripe buffer comprises a dynamically allocated temporary buffer.

6. The system of claim 3, wherein the span buffer comprises a dynamically allocated temporary buffer.

7. The system of claim 1, wherein the disk array comprises three disk drives.

8. The system of claim 1, wherein the request modification means issues each array request to the disk array as a RAID type operation.

9. A method for managing I/O requests directed to a disk array, the disk array comprising a plurality of disk drives, each disk drive partitioned into a set of sector-rows, each sector-row having a predetermined storage capacity, the method comprising the steps of:

creating a set of subrequests from an I/O request, each subrequest within the set created according to an I/O request type, an I/O request length, and sector-row storage capacity;

storing each subrequest within the set of subrequests in a pending queue in first-in, first-out (FIFO) order;

combining each subrequest in the pending queue into a corresponding array request;

storing each array request in an active queue in sector-row order; and issuing each array request to the disk array.

10. The method of claim 9, wherein the step of combining each subrequest in the pending queue into a corresponding array request further comprises the steps of:

selecting a subrequest in the pending queue; and determining for the selected subrequest whether an array request directed to the same sector-row exists in the active queue.

11. The method of claim 10, wherein the step of determining comprises the substeps of:

locating the last sequential array request in the active queue directed to the same sector-row as the selected subrequest; and determining whether the last sequential array request is a write operation.

12. The method of claim 11, wherein the step of determining whether the last sequential array request is a write request further comprises the substeps of:

determining whether the selected subrequest corresponds to a write operation; and merging the selected subrequest into the last sequential array request in the event that the selected subrequest corresponds to a write operation.

13. The method of claim 12, wherein the step of determining whether the selected subrequest corresponds to a write operation further comprises the substeps of:

creating a new array request corresponding to the selected subrequest; and inserting the new array request into the active queue following the last sequential array request.

14. The method of claim 11, wherein the step of determining whether the last sequential array request is a write operation further comprises the substeps of:

creating a new array request corresponding to the selected subrequest; and inserting the new array request into the active queue following the last sequential array request.

15. The method of claim 10, wherein the step of determining comprises the substeps of:

creating a new array request corresponding to the selected subrequest; and inserting the new array request into the active queue in sector-row order.

16. The method of claim 9, wherein the step of issuing each array request comprises the steps of:

selecting an array request for issuance; and determining whether the selected array request corresponds to a write operation.

17. The method of claim 19, wherein the step of determining comprises the substeps of:

determining a subset of disk drives within the disk array to which data is to be written;

determining whether a disk drive within the subset is to receive more than one set of data;

copying the data to be written to each disk drive within the subset of disk drives into a span buffer; and writing the data within the span buffer to the disk drives within the subset.

18. The method of claim 17, wherein the step of determining whether a disk drive within the subset is to receive more than one set of data comprises the substeps of:

determining whether the sets of data to be written to the disk drive are contiguous; and reading data stored on the disk drive ranging from the lowest address to the highest address spanned by the data sets into a span buffer in the event that the sets of data are not contiguous.

19. The method of claim 17, wherein the step of copying the data to be written to each disk drive into the span buffer is performed in order of the first-received set of data to the last-received set of data.

20. The method of claim 17, wherein the step of writing the data within the span buffer to the disk drives within the subset is performed as a RAID type write operation.

21. The method of claim 9, wherein the step of creating the set of subrequests from an I/O request received comprises the step of determining whether the I/O request received corresponds to a write request.

22. The method of claim 21, wherein the step of creating the set of subrequests from an I/O request further comprises the substep of creating a subrequest corresponding to a read operation.

23. The method of claim 21, wherein the step of creating the set of subrequests from an I/O request further comprises the substeps of:

determining a subrequest count corresponding to the number of disk drives to which data is to be written; and creating a number of subrequests equal to the subrequest count, each of the subrequests created corresponding to a portion of the write request.

24. A system for managing I/O requests directed to a disk array, the disk array comprising three disk drives, each disk drive partitioned into a set of sector-rows, each sector-row having a storage capacity, the system comprising:

means for creating a set of subrequests from an I/O request, each subrequest within the set created according to an I/O request type, an I/O request length, and sector-row storage capacity;

means for storing each subrequest within the set of subrequests in a pending queue in first-in, first-out (FIFO) order;

means for incorporating each subrequest in the pending queue into a corresponding array request;

means for storing each array request in an active queue in sector-row order; and means for issuing each array request to the disk array.

25. The system of claim 24, further comprising:

means for determining whether the I/O request corresponds to a write request;

means for creating a subrequest corresponding to a read operation from the I/O request received in the event that the I/O request received does not correspond to a write request;

means for determining a subrequest count corresponding to the number of disk drives to which data is to be written; and means for creating a number of subrequests equal to the subrequest count, each of the subrequests created corresponding to a portion of a write request.

26. The system of claim 24, further comprising:

means for selecting a subrequest in the pending queue;

means for determining for the selected subrequest whether an array request directed to the same sector-row exists in the active queue;

means for locating the last sequential array request in the active queue directed to the same sector-row as the selected subrequest;

means for determining whether the last sequential array request is a write operation;

means for determining whether the selected subrequest corresponds to a write operation; and means for merging the selected subrequest into the last sequential array request in the event that the last sequential array request and the selected subrequest correspond to a write operation.

* * * * *